United States Patent Office 2,845,400
Patented July 29, 1958

2,845,400

HYDRAZINE RESINS

Bernard Rudner, Baltimore, Md., assignor to W. R. Grace & Co., New York, N. Y., a corporation of Connecticut No Drawing. Application August 12, 1955
Serial No. 528,127

17 Claims. (Cl. 260—68)

This invention relates to new polymers, and more particularly to a new kind of nitrogenous resins, specifically, hydrazine resins. The invention also relates to a method of preparing these hydrazine resins form a mixture of hydrazine and ammonia.

It is well known that urea, formaldehyde and ammonia react to form polymeric condensates. Also, urea, formaldehyde and hydrazine have been reported to form a heterocycle, $H_2NN(CH_2NH)_2CO$, which may be recovered. It is possible that this latter material may form a polymer, but only on further reaction. In accordance with the present invention, it is now possible to prepare a resin similar to, but substantially more rigid than, the urea, formaldehyde, ammonia-type product by condensing urea and formaldehyde with a mixture of hydrazine and ammonia or their salts. The novel resins have been found to exhibit a marked affinity not only for copper, which is shown by resins made without hydrazine, but also for chromium salts. The copper and chromium chelating ability, together with other properties enumerated hereinafter, makes these hydrazine resins particularly useful in the dye industry. For example, one of the compounds commonly used to increase the washfastness of after-coppered dyings is prepared by the condensation of dicyandiamide with formaldehyde and ammonium chloride. The resulting resin has no effect, however, upon chromed dyings, since the chelating moiety of the polymer has no affinity for chromium salts. In accordance with the present invention, a dicyandiamide resin will contain a plurality of

—HN—NH— and

groups, which in combination with other groups are capable of chelating both copper and chromium.

In accordance with the method of the present invention, a nitrogen containing compound having the formula:

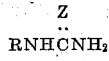

is condensed with an active aldehyde and a hydrazine-ammonia mixture. Volatilization of the hydrazine and ammonia constituents of the mixture are avoided during the reaction, and the resulting hydrazine resin is recovered from the reaction mixture.

In the starting nitrogen containing compound, $RNHCZNH_2$

Z represents a member of the class consisting of O, S and NH, and R represents a member of the class consisting of alkyl or aryl radicals, hydrogen, groups replaceable by hydrogen upon reduction and groups replaceable by hydrogen upon hydrolysis. It is to be understood that groups replaceable by hydrogen upon reduction are those R groups attached to the nitrogen in $—NHCZNH_2$ which when the complete compound is hydrogenolized will be replaced by hydrogen to form $HNHCZNH_2$. In most instances, these groups when attached to $—NHCZNH_2$ will provide a compound containing the —HN—NH— linkage. Examples of compounds containing groups replaceable by hydrogen upon reduction are semicarbazide ($H_2N—NHCONH_2$), biurea ($H_2NCONH—NHCONH_2$) and their substituents. Likewise, it is to be understood that groups replaceable by hydrogen upon hydrolysis are those R groups which when the compound is partially hydrolyzed will be replaced by hydrogen to form $HNHCZNH_2$. In many instances such groups will contain carbon attached to an atom other than carbon through a double or triple bond. Examples of compounds containing such groups are biuret ($NH_2CO—NHCONH_2$) and dicyandiamide ($NC—NHCNHNH_2$).

The starting nitrogen compound containing the $—NHCZNH_2$ moiety may thus be urea, thiourea, guanidine, or one of the above specified general substituents of one of these materials. Furthermore, it is possible to use the above compounds in the form of salts of strong mineral acids as starting materials, e. g., guanidine hydrochloride.

Active aldehydes which can be employed in the present process include, in addition to formaldehyde, glyoxal and furfuraldehyde as well as the lower aliphatic aldehydes such as acetaldehyde and butyraldehyde, etc. Formaldehyde is the aldehyde of first choice. However, very interesting resins are formed through the use of other aldehydes and mixtures of formaldehyde and other aldehydes. It is generally preferred to use formaldehyde in aqueous solution, such as formalin. The concentration of aldehyde in the reaction mixture is desirably between about 0.75 and 3 equivalent —CHO groups per equivalent of base in the reaction mixture.

As indicated, the instant condensation is effected in the presence of a hydrazine and ammonia mixture. In order that the resulting resins possess the above indicated desirable properties, it is important that the mixture contain between about 3 and 94% by weight equivalent hydrazine. The present invention is not limited to the use of a hydrazine-ammonia mixture as such, but mixtures of hydrazine and ammonia and/or their salts of strong mineral acids may also be employed. Similarly, only one of the components of the mixture may be in the form of a salt, for example, hydrazine-ammonium chloride. The present invention is particularly well suited to the use of a hydrazine-hydrazine hydrochloride-ammonia-ammonium chloride mixture prepared by the process of Sisler et al. Patent No. 2,710,248, "Process of Forming Hydrazine," as well as the residue remaining after separation a large part of the hydrazine from the Sisler mixture. In any case, it is important that the mixture contain between 3 and 94% by weight equivalent $N_2H_4$.

In carrying out the method of the present invention, the hydrazine-ammonia mixture, usually in aqueous solution, is commingled with a solution of active aldehyde followed by the addition of an aqueous solution or slurry of the nitrogen-containing compound, $RNHCZNH_2$ to the resulting mixture with agitation. Generally the condensation reaction is exothermic, and care should be exercised to prevent volatilization of reactants.

It is important that the condensation reaction be carried out in the presence of anions of a strong mineral acid, such as chloride or sulfate ions. When the starting $RNHCZNH_2$ compound is in the form of its hydrochloride or sulfate salt, or when the hydrazine-ammonia mixture contains hydrazine or ammonia salts of strong acids, the addition of said ions to the reaction mixture is often unnecessary. However, the presence of said ions in excess before or during reaction does not appear to have a detrimental effect, and their presence results in the formation of a water soluble hydrazine resin salt product in most cases. In certain instances, often depending upon the particular $RNHCZNH_2$ starting material chosen, it is desirable to neutralize the hydrazine-ammonia mixture with acids such as hydrochloric or sulfuric prior to the condensation.

The following examples are given by way of illustration and are not intended as limitations on the scope of this invention.

Example I

An aqueous mixture of hydrazine, ammonia and ammonium chloride containing 4.4% by weight of hydrazine, a residue remaining after removal of most of the hydrazine from a mixture produced by the Sisler process, was carefully neutralized with hydrochloric acid, and then added to chilled formalin containing 1.6 equivalents of $CH_2O$ per equivalent of base. An aqueous slurry of dicyandiamide (0.45 equivalents per equivalent of base) was then added to the chilled mixture, and the solution stirred at 15–20° C. overnight. The temperature was then raised to 80–85° C. for two hours after which the solution was evaporated on a steam-heated drum drier. The tan, water-soluble hydrazine resin product gave an immediate precipitate with $Fe+++$, $Cr+++$, and the anion of Congo red, the first two by complex formation and the third by salt formation.

Example II

An aqueous mixture containing 93.4% hydrazine, 4.9% ammonia and 1.7% by weight ammonium chloride was neutralized with sulfuric acid, and then mixed with a concentrated solution of dicyandiamide (0.7 equivalent per equivalent of base). This mixed solution gave an immediate heat of reaction upon addition thereto of 2.3 equivalents of $CH_2O$ (as formalin) per equivalent of base. When the reaction subsided, the mixture was heated until free formaldehyde had disappeared, and then drum-dried. The light brown hydrazine resin solid showed a marked affinity for $Cr+++$ and $Cu++$ salts.

Example III

Phenylthiourea in the amount of 2.3 g., 0.7 g. hydrazine hydrochloride and 0.6 g. ammonium chloride were slurried in 10 ml. of water and the mixture treated with 1.2 g. formaldehyde as a 10% aqueous solution. The mixture boiled for a short time. The phenylthiourea dissolved forming a clear solution which subsequently turned red and, on cooling, precipitated a gummy hydrazine resin. The red gum was neutralized with sodium carbonate which gave a yellow resin. This material was freed of its turbid red supernatant, titurated with water and air dried to yield 2.1 g. of yellow solid. The yellow resin melted between 50 and 70° C. and evolved gas at about 90° C. The turbid decantate contained less than 0.1 g. of hydrazine as determined by salicylidene azine formation. The amorphous, low-melting hydrazine resin condensate in ethanol formed an alcohol-insoluble, tan copper salt and an alcohol-soluble, pale rose chromium salt.

Example IV

The addition of 4.3 g. of 35% formalin to 1.95 g. guanidine hydrochloride, 4 g. of 25% $NH_4OH$ and 0.5 g. anhydrous hydrazine in 15 ml. of water caused considerable evolution of heat. The clear solution was boiled a few minutes until it turned turbid. Upon cooling it set to a white gel. Dilution and filtration produced an amorphous, white solid hydrazine resin which air-dried hard and glossy. The product weighed 2.1 g. and melted above 200° C. The combined filtrate and wash contained no detectable hydrazine by dimethylaminobenzaldehyde. The resin in alcohol, gave a soluble blue copper salt, and a rose precipitate with ammonical chromic chloride.

Example V

The use of a 30% aqueous glyoxal solution instead of formalin in Example IV produced a deep red clear solution which did not form a solid on heating. Upon cooling, treatment with acetic acid yielded a stringy hydrazine resin melting above 250° C. Thus precipitated, the resin was insoluble in common solvents, and only very slightly soluble in strong acid.

Because of their ability to form complexes with many metal salts not chelated by the hydrazine-free products, the soluble hydrazine resins of the present invention are particularly useful in the treatment of chrome or copper dyings. Furthermore, the presence of the

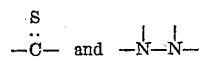

residue in the novel resins affords marked anti-oxidant powers. As a result, the dyed textile shows less tendency to undergo the color fading associated with dye oxidation. Similarly, the hydrazine residues permit after-treatment of the textile with formaldehyde or anti-crease agents without loss of dye color value.

These same properties hold for the less soluble, more rigid polymers obtained by choice, from use of different reactant combinations (e. g., glyoxal plus dicyandiamide plus ammonium chloride plus hydrazine hydrochloride) or different reactant ratios or different reaction conditions. Rigid polymers, for example, from dicyandiamide, being water insoluble, function effectively as specific ion exchange resins, useful for removing $Cu++$, $Cr+++$, or $SO_4^=$ from solution. Here again, incorporation of

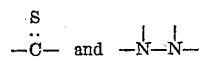

introduces the power to chelate $Cr+++$. Other resins, particularly those derived from the thiourea derivatives, show marked biocidal activity, presumably ascribable to both the

groups. The copper chelates of such resins show similar properties.

I claim:

1. A process for preparing hydrazine containing resins capable of chelating both copper and chromium which comprises reacting in the presence of anions of a strong mineral acid: (a) 0.4 to 2.6 equivalents of

per equivalent nitrogen base hereunder described, wherein Z is a member selected from the group consisting of O, S and NH and R is a monovalent radical selected from the group consisting of alkyl, aryl, hydrogen, groups replaceable by hydrogen upon reduction and groups replaceable by hydrogen upon hydrolysis, (b) 0.75 to 3.0 equivalents of R'CHO per equivalent nitrogen base hereunder described, wherein R' is a member selected from the group consisting of hydrogen and monovalent radicals containing less than five carbon atoms, (c) at least two members of a nitrogen base group consisting of ammonia, hydrazine, strong mineral acid salts of ammonia and strong mineral acid salts of hydrazine in amounts sufficient to provide 3-94% by weight equivalent of hydrazine; and recovering the resultant resin from the reaction medium.

2. A process for preparing hydrazine containing resins capable of chelating both copper and chromium which comprises reacting in the presence of chloride ions: (a) 0.4 to 2.6 equivalents of

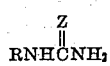

per equivalent nitrogen base hereunder described, wherein Z is a member selected from the group consisting of O, S and NH and R is a monovalent radical selected from the group consisting of alkyl, aryl, hydrogen, groups replaceable by hydrogen upon reduction and groups replaceable by hydrogen upon hydrolysis, (b) 0.75 to 3.0 equivalents of R'CHO per equivalent nitrogen base hereunder described, wherein R' is a member selected from the group consisting of hydrogen and monovalent radicals containing less than five carbon atoms, (c) at least two members of a nitrogen base group consisting of ammonia, hydrazine, ammonium chloride and hydrazine hydrochloride in amounts sufficient to provide 3-94% by weight equivalent of hydrazine; and recovering the resultant resin from the reaction medium.

3. A process according to claim 1 wherein the anions are sulfate and the reactants are 0.70 equivalent dicyandiamide, 2.3 equivalents formaldehyde, 0.1 equivalent ammonia, 0.92 equivalent hydrazine and 0.07 equivalent ammonium chloride.

4. A process according to claim 2 wherein the reactants are 0.45 equivalent dicyandiamide, 1.6 equivalents formaldehyde, 0.04 equivalent ammonia, 0.07 equivalent hydrazine and 0.89 equivalent ammonium chloride.

5. A process according to claim 1 wherein the anions are chloride and the reactants are 0.706 equivalent phenylthiourea, 1.9 equivalents formaldehyde, 0.52 equivalent ammonium chloride and 0.48 equivalent hydrazine hydrochloride.

6. A process according to claim 2 wherein the reactants are 0.46 equivalent guanidine, 1.1 equivalents formaldehyde, 0.65 equivalent ammonia and 0.35 equivalent hydrazine.

7. A process according to claim 1 wherein the anions are chloride and the reactants are 0.46 equivalent guanidine, 0.97 equivalent glyoxal, 0.65 equivalent ammonia and 0.35 equivalent hydrazine.

8. As a new composition of matter, the products obtained by the process of claim 3.

9. As a new composition of matter, the products obtained by the process of claim 4.

10. As a new composition of matter, the products obtained by the process of claim 5.

11. As a new composition of matter, the products obtained by the process of claim 6.

12. As a new composition of matter, the products obtained by the process of claim 7.

13. As new compositions of matter, the products obtained by the process of claim 1.

14. As new compositions of matter, the products obtained by the process of claim 2.

15. As new compositions of matter, the metal derivatives selected from the group consisting of copper, chromium and iron chelates of the products obtained by the process of claim 1.

16. As new compositions of matter, the chromium chelates of the products obtained by the process of claim 1.

17. As new compositions of matter, the copper chelates of the products obtained by the process of claim 1.

References Cited in the file of this patent

FOREIGN PATENTS 826,512   France _____ Sept. 10, 1957

OTHER REFERENCES

Audrieth: "Chemistry of Hydrazine," Wiley & Sons, New York (1951), page 194.